Jan. 16, 1940.   J. G. DEGERTH ET AL   2,187,600

BEARING ASSEMBLY

Filed Oct. 26, 1938

INVENTORS
John Gustaf Degerth
and Louis Dambrowsky
BY
Munn, Anderson & Liddy
ATTORNEYS Patented Jan. 16, 1940

2,187,600

UNITED STATES PATENT OFFICE 2,187,600

BEARING ASSEMBLY

John Gustaf Degerth and Louis Dombrowsky, Helsingfors, Finland, assignors, by mesne assignments, to Wärtsilä-Yhtymä O/Y.-Wärtsilä-Koncernen A/B, Vartsila, Finland Application October 26, 1938, Serial No. 237,098
In Finland November 24, 1937

3 Claims. (Cl. 308—147)

This invention relates to an improved bearing assembly, particularly to a bearing assembly for centrifugal separators or the like which are fitted with rotors rotating at a relatively high rate of speed around a vertically disposed spindle.

Experience has proved that in practice it is impossible to mount and arrange a rotor with a relatively high speed of revolution in theoretically perfect balance. It is therefore customary to make at least one bearing, usually the one that is situated nearest the rotor, somewhat resilient as by springs disposed radially around the bearing. This is done in order that the vibrations which arise in the spindle owing to the above-mentioned greater or less imperfect balance in the rotor should not be transmitted to the frame and other parts of the machine. However, in connection with such a construction, especially when the machine has been in use for a considerable time and the imperfect balance of the rotor owing to one reason or another has become more accentuated, various disturbances in the smooth running of the rotor frequently arise. These disturbances are undesirable and may be of such a nature as to have a detrimental effect upon various parts of the machine.

Attempts have heretofore been made over a relatively long period of time to construct bearings of the above type that would eliminate these disturbances but the attempts have all been more or less unsuccessful. It is believed that by means of the present invention the several difficulties discussed above have been solved. Thorough tests have shown that an absolutely smooth and safe running of the rotor will be obtained even if the rotor should be considerably out of balance.

In the accompanying drawing in which one embodiment of our invention is illustrated—

Figure 1:
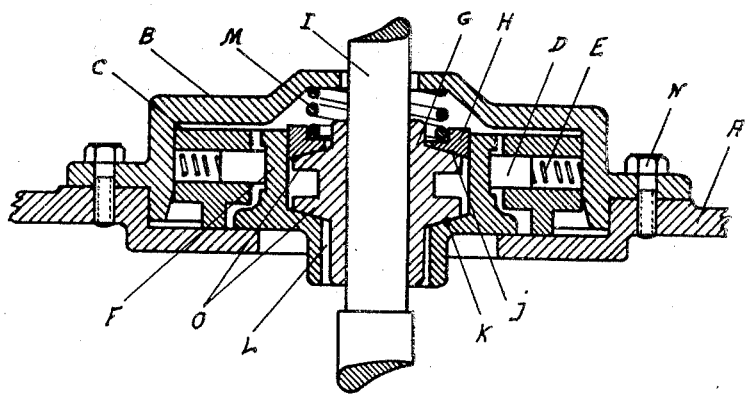
Figure 2:
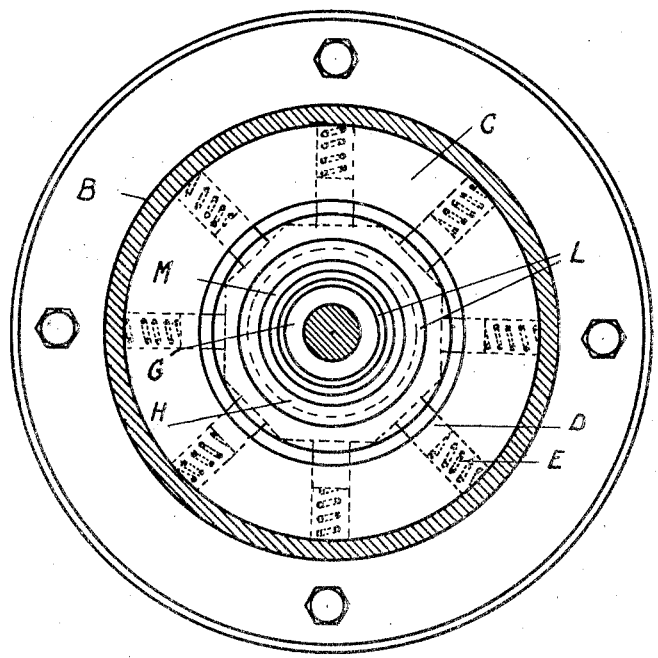

Fig. 1 shows a partially sectional elevation of a bearing assembly embodying our invention together with adjacent portions of the frame and the machine; and Fig. 2 shows a sectional plan view at right angles to the spindle of the machine.

The vertical spindle indicated at I is surrounded by a bearing housing B which is fastened by screws N to the frame A of the machine. Within the space which is formed between the bearing housing and the frame an annular buffer holder C is fitted coaxially with the machine spindle and equipped with a number of loosely mounted radial buffer pins D. Between each buffer pin D and the bearing housing B a spiral spring E is fitted so as to urge the pins radially inwardly. At their inner ends the buffer pins press against the retaining sleeve F of the bearing bushing G which, if desired, may be a ball bearing. The retaining sleeve F, together with the annular member H and the spiral spring M disposed around and coaxial with the spindle I serve to guide and center the bearing bushing G. For this purpose the bushing G is provided with an annular flange formed in two sections O, having angularly disposed contact or bearing surfaces K and J tapering towards the periphery of the flange and retaining sleeve F and the annular member H have corresponding angularly disposed bearing surfaces adapted to engage the surfaces K and J. It will be appreciated that the pressure at these contact surfaces depends upon the strength and tension of the spiral spring M.

So that the bushing G may be moved in a radial direction a slight clearance L is provided between the bushing G and the retaining sleeve F and between the bushing G and the annular member H.

The chief object of this construction is to permit vibration of bushing G and spindle I without the vibration being transmitted to the parts F, D and E and in that way the setting up of slower oscillations of greater amplitude or other disturbances in the operation of the spindle will be prevented. This result is accomplished by making the springs E of sufficient resistance so that they do not permit considerable oscillations to be set up but nevertheless sufficiently yielding so that they form a somewhat elastic or resilient support for the spindle in the event that a tendency for oscillations of greater amplitude should arise. The result is further accomplished by means of the spring M which tightens the bearing bushing G between the retaining sleeve F and the annular member H so that the movements of the bushing in a radial direction are suitably guided relatively freely but nevertheless with a certain amount of resistance.

We claim:

1. A bearing assembly comprising a rotatable shaft, a bushing disposed around the shaft and having an annular projecting portion formed therearound with a pair of angularly disposed bearing surfaces which converge towards the periphery of said portion, a fixed support, a housing for the bearing assembly mounted on the support, an annular bearing member mounted on the fixed support and having an angularly disposed bearing surface adapted to engage one of the bearing surfaces on the bushing and a cylindrical flange surrounding and spaced from the bushing, a second annular bearing member having an angularly disposed bearing surface adapted to engage the other bearing surface of the bushing, means including resilient members extending between the sides of the housing and the cylindrical portion of the first bearing member, and a resilient member disposed parallel to and coaxially with the shaft and extending between the second bearing member and the housing, said resilient members being adapted to urge the bearing members into contact with the bearing surfaces of the bushing and to permit limited vibrations of the shaft while preventing transmission of the vibrations to the housing.

2. A bearing assembly as specified in claim 1 in which the resilient members comprise spiral springs arranged radially in said housing and the resilient member comprises a spiral spring disposed around the shaft and extending between the top of the housing and the second bearing member.

3. A bearing assembly comprising a rotatable shaft, a bearing housing surrounding a portion of the shaft, a bushing disposed around the shaft inside the housing, a pair of bearing members provided with bearing surfaces engageable with the upper and lower portions respectively of the bushing, and shiftable relative to each other in a direction parallel to the shaft, resilient means parallel to the shaft and extending between one of the bearing members and the housing for urging the bearing members towards each other and into engagement with the bushing, and radially disposed resilient means extending between one of the bearing members and the housing, said resilient means being adapted to permit limited vibration of the shaft while preventing transmission of the vibration to the housing.

JOHN GUSTAF DEGERTH.
LOUIS DOMBROWSKY.